US011431619B2

(12) United States Patent
Malhotra et al.

(10) Patent No.: US 11,431,619 B2
(45) Date of Patent: Aug. 30, 2022

(54) HIERARCHICAL ECMP CONTROL PLANE FOR DENSE TOPOLOGIES

(71) Applicant: Cisco Technology, Inc., San Jose, CA (US)

(72) Inventors: Neeraj Malhotra, Los Gatos, CA (US); Satya Ranjan Mohanty, San Ramon, CA (US); Dongling Duan, San Jose, CA (US); Nitin Kumar, San Jose, CA (US); Narasimha Prasad Salagame Nagaraj, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 36 days.

(21) Appl. No.: 17/160,102

(22) Filed: Jan. 27, 2021

(65) Prior Publication Data

US 2022/0239588 A1    Jul. 28, 2022

(51) Int. Cl.
*H04L 45/24* (2022.01)
*H04L 45/74* (2022.01)
*H04L 47/17* (2022.01)

(52) U.S. Cl.
CPC .............. *H04L 45/24* (2013.01); *H04L 45/74* (2013.01); *H04L 47/17* (2013.01)

(58) Field of Classification Search
CPC .......... H04L 45/24; H04L 45/74; H04L 47/17
See application file for complete search history.

(56) References Cited

U.S. PATENT DOCUMENTS

| | | | |
|---|---|---|---|
| 9,479,437 B1* | 10/2016 | Zhou ....................... | H04L 45/24 |
| 2017/0366450 A1 | 12/2017 | Gattani | |
| 2018/0227212 A1* | 8/2018 | Ferguson ................ | H04L 45/22 |
| 2020/0067823 A1* | 2/2020 | Malhotra ................ | H04L 12/44 |
| 2020/0186460 A1* | 6/2020 | Power ..................... | H04L 45/22 |
| 2020/0313956 A1 | 10/2020 | Heitz et al. | |
| 2020/0336420 A1 | 10/2020 | Joshi et al. | |
| 2021/0021522 A1* | 1/2021 | Labonté ................ | H04L 47/125 |

FOREIGN PATENT DOCUMENTS

| | | | | | |
|---|---|---|---|---|---|
| CN | 108833272 A | * | 11/2018 | ......... | H04L 12/4633 |
| KR | 20090016281 A | * | 2/2009 | ............ | H04L 45/74 |
| TW | 202034737 A | | 9/2020 | | |
| WO | WO-2013117166 A1 | * | 8/2013 | ........... | H04L 12/462 |
| WO | WO2020041699 A1 | | 2/2020 | | |

\* cited by examiner

*Primary Examiner* — Eunsook Choi
(74) *Attorney, Agent, or Firm* — Lee & Hayes, P.C.

(57) ABSTRACT

Techniques and mechanisms for a control plane approach for dense topologies that focusses on discovering shared ECMP groups in the control plane independent of per-prefix learning and then learning prefixes via these shared ECMP groups instead of learning prefixes via one next-hop at a time. In dense topologies, this approach helps minimize BGP path scale, corresponding signaling and enables control plane scaling that is an order of magnitude higher than a traditional eBGP control plane. During link and node topology changes, the described control plane approach enables control plane signaling that is prefix independent and an order of magnitude lower. A control plane approach to path-list sharing and prefix independent signaling on link and node topology changes enables prefix independent convergence (PIC) in scenarios that would not be possible otherwise with traditional FIB driven path-list sharing and PIC.

20 Claims, 11 Drawing Sheets

HIERARCHICAL ECMP CONTROL PLANE FOR DENSE TOPOLOGIES

TECHNICAL FIELD

The present disclosure relates generally to an external border gateway protocol (eBGP) based routing control plane for dense topologies and more particularly to an eBGP based routing control plane for dense topologies that discovers shared equal cost multi-path (ECMP) routing groups in the control plane independent of per-prefix signaling.

BACKGROUND

Hop-by-hop eBGP is a popular distributed control plane alternative to an internal border gateway protocol (iBGP) in dense topologies such as, for example, a hierarchical Clos network, for its simplicity and scale. In a massively scalable data center (MSDC) Clos network, as fabric scale requirements continue to grow rapidly in dimensions of node scale and ECMP fan-out, both the eBGP control plane and the forwarding data plane are met with scaling challenges never seen before. Specifically, aggregation layer routers connecting multiple data center (DC) sites are seeing border group protocol (BGP) path scale and ECMP fan-out that is orders of magnitude higher than ever seen before. Besides the network scale, prefixes that may be reachable via multiple or all DC sites are a factor contributing to such BGP path and ECMP fan-out explosion. This is illustrated in FIG. 1 using a hypothetical MSDC network.

FIG. 1 schematically illustrates an example MSDC network 100 consisting of 32 DC sites 102 running a hop-by-hop eBGP Internet protocol version 4/Internet protocol version 6 (IPv4/IPv6) unicast control plane. Each DC site 102 is composed of 300 pods 104 connected together via 32 spines 106 at layer T2. Each pod 104 consists of 32 top of racks (ToRs) 108 at layer T0 connected via 8 nodes 110 at layer T1. These 32 data center sites are connected via an aggregation layer of 32 routers 112 at layer T3 for both east-west and external connectivity. Certain IP prefixes may also be reachable via multiple or all DC sites 102.

For a prefix scale of N that may be reachable via any of the DC sites 102, on each aggregation layer (T3) router 112, this results in a BGP path scale of [N*32*32] and an ECMP set of up to 1024 BGP next-hops in forwarding. For N=500K, this amounts to 512 million BGP paths and an ECMP set of up to 1024 BGP next-hops in forwarding. The two are prohibitive in existing BGP implementations and in data-plane, respectively. Furthermore, BGP path scale explosion also results in control plane signaling on topology changes that is prohibitive for central processing unit (CPU) packet paths.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
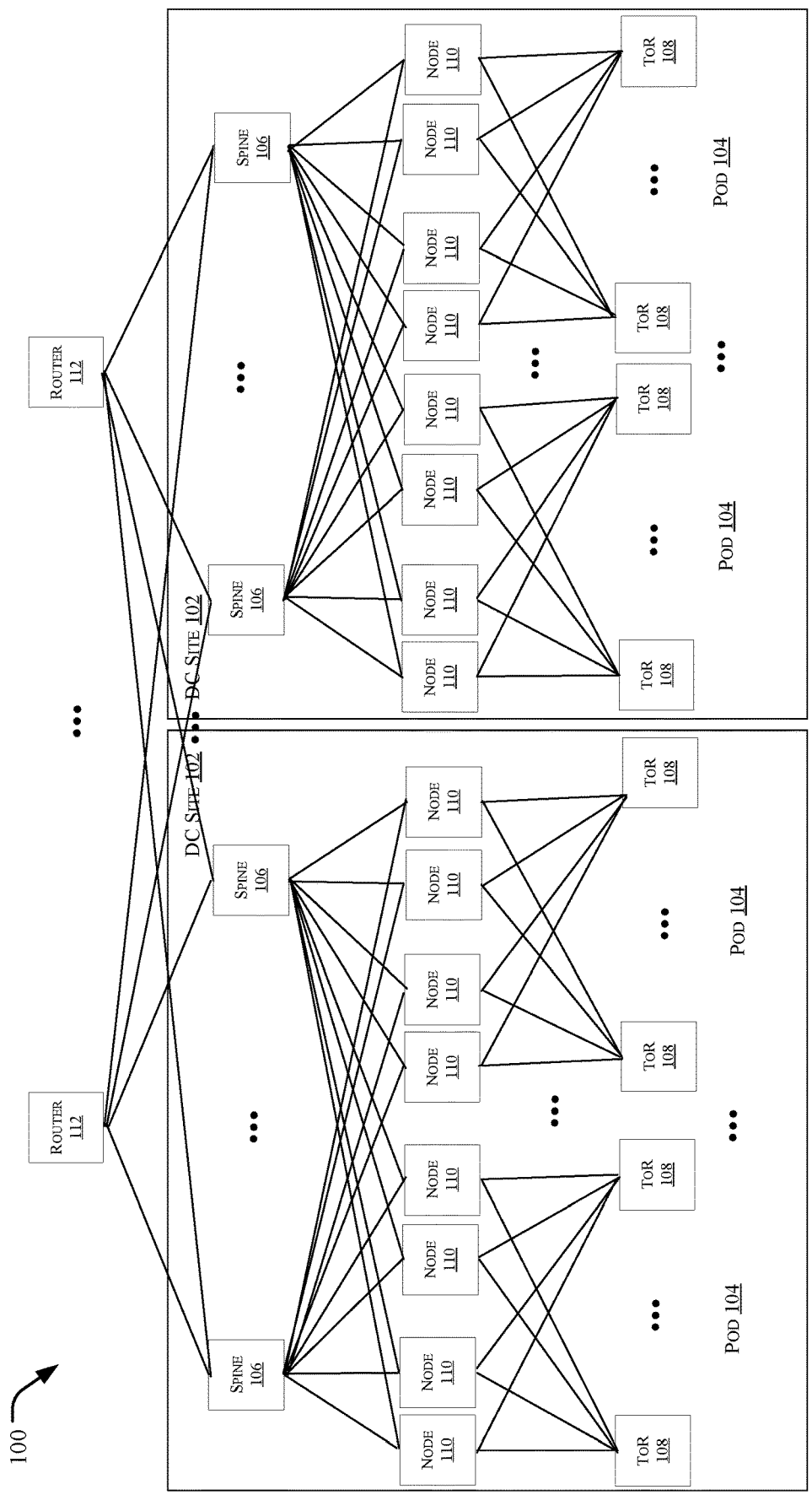
FIG. 1 schematically illustrates an example MSDC network consisting of 32 DC sites running a hop-by-hop eBGP IPv4/IPv6 unicast control plane.

This disclosure describes techniques for a different control plane approach for dense topologies that focusses on discovering shared ECMP groups in the control plane independent of per-prefix learning and then learning prefixes via these shared ECMP groups instead of learning prefixes via one next-hop at a time. In dense topologies, this approach helps minimize BGP path scale, corresponding signaling and enables control plane scaling that is an order of magnitude higher than a traditional eBGP control plane. During link and node topology changes, the described control plane approach enables control plane signaling that is prefix independent and an order of magnitude lower. A control plane approach to path-list sharing and prefix independent signaling on link and node topology changes enables prefix independent convergence (PIC) in scenarios that would not be possible otherwise with traditional FIB driven path-list sharing and PIC. In high ECMP fan-out scenarios such as the example illustrated in FIG. 1, the control plane approach described herein enables hierarchical ECMP discovery in the control plane that scales forwarding ECMP resources significantly better than traditional flattened ECMP.

While the procedures and algorithms described herein may be defined as a new protocol, existing eBGP signaling is used in a different way to achieve such anew protocol for easier adoption, interworking, and migration from traditional hop-by-hop eBGP. Thus, as compared to traditional eBGP, the new protocol described herein looks to achieve the following results in a dense network topology: BGP path and message scale minimization via shared ECMP discovery in the control plane; prefix independent signaling on incremental link and node topology changes; ECMP fan-out scaling via hierarchical ECMP discovery in the control plane; and optimal per-flow load-balancing via hierarchical ECMP discovery in the control plane. Together, these results aim to enable eBGP based dense topologies that are able to scale up by an order of magnitude.

Accordingly, as an example of a control plane approach, an upstream node receives a next-hop group (NHG) identification (ID) from a first intermediate node. The first intermediate node is downstream from the upstream node and the NHG ID identifies a NHG of intermediate nodes that each have peering to a downstream node that advertises one or more Internet Protocol (IP) prefixes. At the intermediate node, the router ID of a peering downstream node may be used as the NHG ID. The upstream node receives the same NHG ID from a second intermediate node. The second intermediate node is downstream from the upstream node. The upstream node receives the same NHG ID from a third intermediate node. The third intermediate node is downstream from the upstream node. The upstream node learns and programs an ECMP next-hop group for this NHG ID with the three intermediate nodes as member next-hops. The upstream node designates the first intermediate node as a primary designated speaker for the NHG. The upstream node receives the one or more IP prefixes from only the first intermediate node via the NHG ID, and programs these prefixes via the previously learned ECMP next-hop group.

Additionally, the techniques described herein may be performed by a system and/or apparatus having non-transitory computer-readable media storing computer-executable instructions that, when executed by one or more processors, performs the method described above.

Example Embodiments

In configurations, path-list sharing in a control plane includes an upstream node discovering shared ECMP next-hop groups independent of IP prefix advertisements from downstream "next-hop" nodes. Additionally, a downstream "next-hop" node advertises IP prefixes via this shared next-hop group to upstream nodes. For example, a shared next-hop group is a group of ECMP next-hops that may advertise a common set of IP prefixes to an upstream node. In a multi-layer Clos topology, this leverages the fact that a set of nodes connected to a common downstream node are likely to form an ECMP next-hop group at a common upstream node for IP prefixes learned via the common downstream node.

For example, for IP prefixes reachable via the common downstream node, intermediate nodes form a shared ECMP next-hop group at the upstream node. Once this ECMP next-hop group is learned and programmed on the upstream node, IP prefixes originating from the common downstream node may now be advertised to the upstream node via this next-hop group of intermediate nodes. This fundamental concept of learning and programming ECMP next-hop groups across upstream nodes followed by learning and programming IP prefixes via these next-hop groups is then adapted to a distributed eBGP control plane. Equal path preference that is typical in dense topologies built for ECMP is assumed. The algorithm and control plane around the algorithm are designed to achieve some key scaling, convergence, and forwarding attributes as further discussed below.

In configurations, for BGP path and message minimization, since IP prefixes are advertised via a next-hop group as opposed to via individual next-hops, IP prefix updates may be sent from only one of the intermediate nodes within a downstream next-hop group to an upstream node. Thus, the number of BGP paths received on an upstream node is drastically reduced.

In configurations, in the case of a downstream link DOWN or UP event, the control plane approach described herein allows for signaling a single update to an upstream node to fix the ECMP next-hop group instead of updating all affected IP prefixes. Similarly, on a next-hop group node DOWN or UP event, only the ECMP next-hop group needs to be updated at the upstream node. The control plane approach described herein hence achieves IP prefix independent convergence in the control plane, and dramatically reduces BGP signaling updates on any link or node topology changes. PIC generally would not be possible in this scenario with a traditional forwarding approach to PIC, as convergence on the common upstream node would still be subject to pre-prefix updates or withdraws from one of the intermediate nodes in the next-hop group.

Furthermore, in configurations, an IP prefix may be learned via multiple next-hop groups, resulting in an ECMP set of next-hop groups. In other words, as will be described further below, a two-level hierarchical ECMP of ECMP groups in BGP RIB is achieved instead of a flattened, much larger set of ECMP next-hops that would result with traditional eBGP IPv4/IPv6 unicast. In high ECMP fan-out scenarios, this facilitates much more scalable hierarchical ECMP programming on most modern forwarding dataplanes that are capable of a hierarchical ECMP data path.

In configurations, for scenarios, where the link connectivity may not be uniform, hierarchical ECMP as described herein results in a more optimal per-flow load-balancing in proportion to downstream ECMP fan-out. With two level ECMP load balancing in the data plane that results with a hierarchical ECMP control plane, two intermediate nodes may draw a larger proportion of flows destined to a downstream node from the common upstream node by virtue of having more downstream paths to the downstream node, as compared to two other intermediate nodes. However, by placing the two intermediate nodes having more downstream paths to the downstream node in a second next-hop group while also remaining in a next-hop group with the two other intermediate nodes, network flows may be better balanced among all four intermediate nodes. The load balancing may be further optimized via a link band-width attribute to signal downstream link band-width available for each intermediate node within a given next-hop group.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 2A:
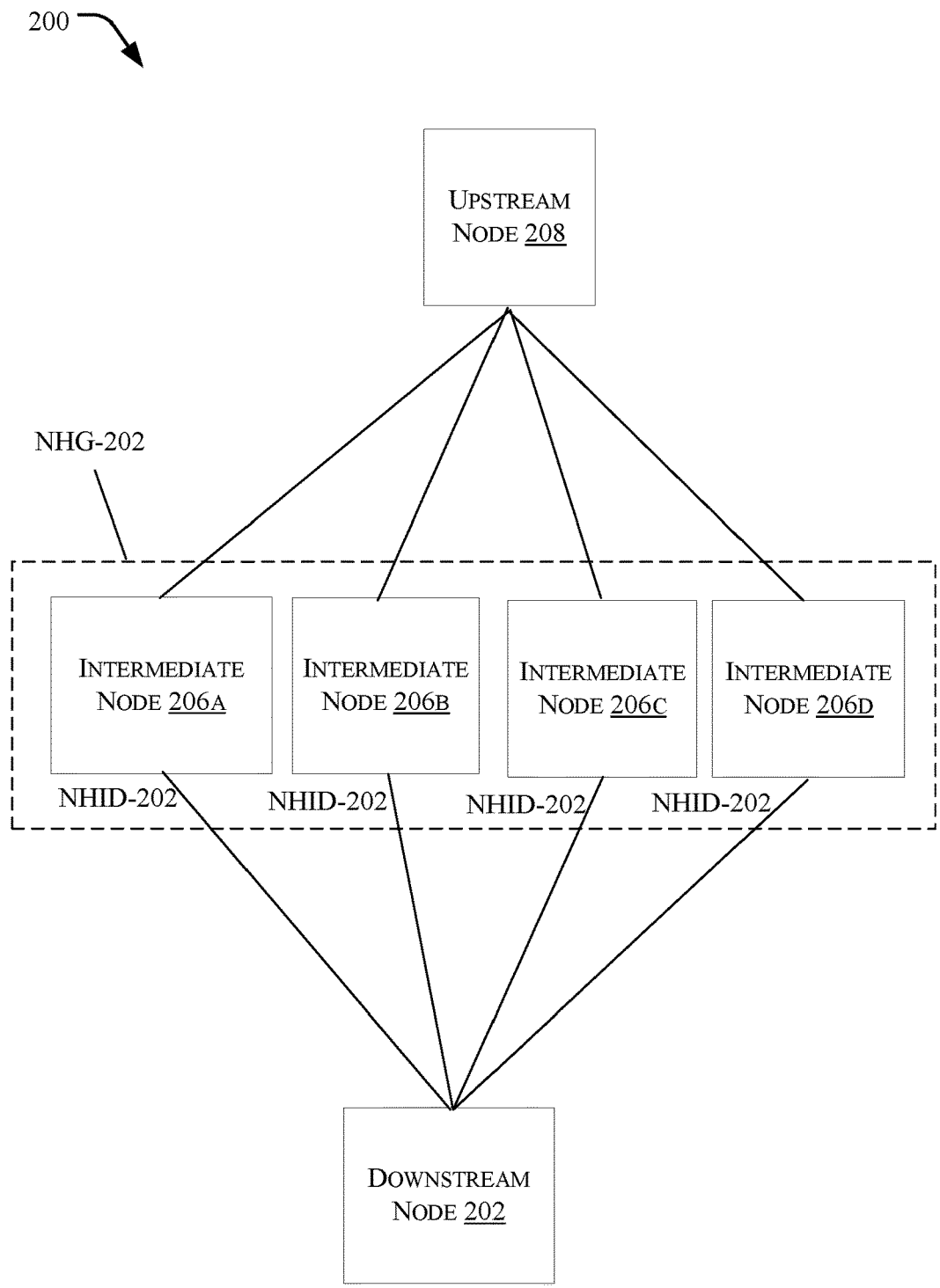
FIGS. 2A-2H schematically illustrate an example of a portion of a DC site implementing various aspects of the techniques described herein.
Figure 2B:
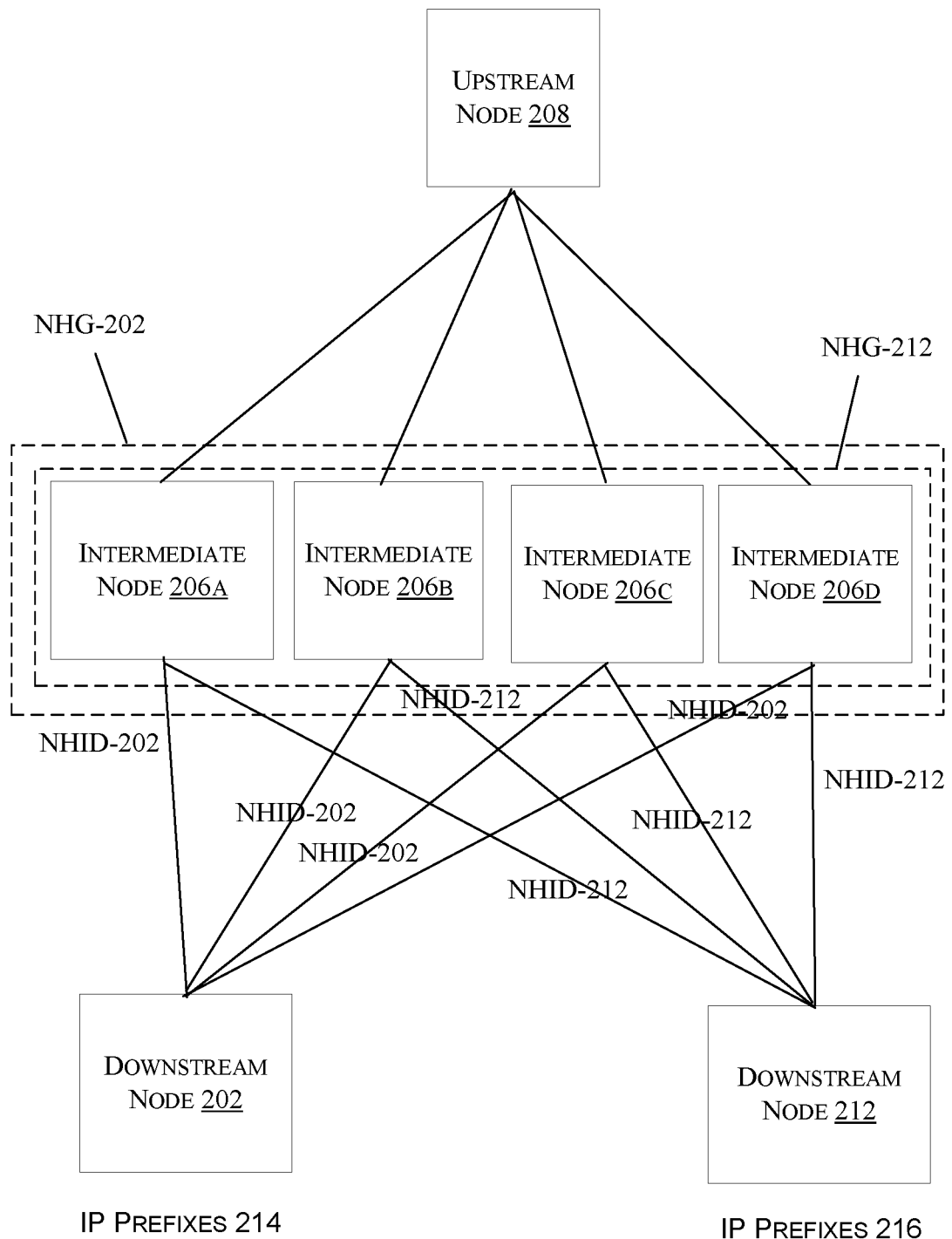

FIGS. 2A and 2B schematically illustrate an example of a portion 200 of a DC site. The portion 200 includes a downstream node 202 that may access one or more IP prefixes. The portion 200 also includes a next-hop group NHG-202 that includes four intermediate nodes 206*a*, 206*b*, 206*c*, and 206*d* that have peer with the downstream node 202 and also peer with an upstream node 208. FIG. 2B illustrates another next-hop group NHG-212 that includes intermediate nodes 206*s*, 206*b*, 206*c*, and 206*d* that also peer with downstream node 212.

In particular, in the context of IP prefixes originated from downstream node 202, downstream node 202 is referred to as the downstream node at upper tier nodes, e.g., for IP prefixes originated from downstream node 202, downstream node 202 is a downstream node at upstream node 208 and intermediate nodes 206*a*, 206*b*, 206*c*, and 206*d*. In the context of IP prefixes originated from downstream node 202, upstream node 208 is referred to as an upstream node at intermediate nodes 206*a*, 206*b*, 206*c*, and 206*d*, e.g., for IP prefixes learned from downstream node 202, upstream node 208 is an upstream node at intermediate nodes 206*a*, 206*b*, 206*c*, and 206*d*. In the context of IP prefixes originated from downstream node 202, intermediate nodes 206*a*, 206*b*, 206*c*, and 206*d* are referred to as intermediate nodes. Next-hop group (NHG) may be a group of its N intermediate node peers that peer with one common downstream node, e.g., downstream node 202. These N nodes are likely to learn the same set of IP prefixes from their common downstream node, e.g., downstream node 202 and advertise them to their common upstream node, e.g., upstream node 208. A NHG may essentially be defined by the N nodes and their common downstream peering node, e.g., downstream node 202, and is of forwarding significance to other upstream nodes peering with these N nodes. For example, NHG-202 is of forwarding significance at upstream node 208. Next-hop group identifier (ID) (NHID) is a globally unique ID assigned to each NHG. This may be configured locally on each of the NHG nodes, e.g., intermediate nodes 206*a*, 206*b*, 206*c*, and 206*d* representing the common downstream peering node or may be set to the downstream node 202's router-ID or loopback IP. Since router-IDs need not be unique across Autonomous Systems, especially in the case of V6 [RFC 6286], care should be taken that in the case here there are unique router-IDs/loopbacks. For example, NHID-202 is the next-hop group ID for NHG-202 that represents peering between intermediate nodes 206*a*, 206*b*, 206*c*, and 206*d* and downstream node 202. NHID-212 is the next-hop group ID for NHG-212 that represents peering between intermediate nodes 206*a*, 206*b*, 206*c*, and 206*d* and downstream node 212. A shared next hop group (NHG) at an upstream node may be defined as a set of nodes that advertise the same set of IP prefixes learned from a common downstream node to this upstream node. A set of nodes peering to a common downstream node, e.g., downstream node 202, will form an ECMP next-hop group at a common upstream peer node, e.g., upstream node 208, for all IP prefixes signaled from the common downstream node, e.g., downstream node 202.

Thus, in configurations, a local NHID (representing a downstream peer) is signaled by each NHG member node to all the other upstream nodes. An upstream node on receiving NHID paths from each member node forms an ECMP next-hop group keyed by the received NHID. In the example above, intermediate nodes 206*a*, 206*b*, 206*c*, and 206*d* signal there local NHIDs, e.g., NHID-202 and NHG-212 to upstream node 208. Upstream node 208 receives NHID-202 paths from intermediate nodes 206*a*, 206*b*, 206*c*, and 206*d* and accordingly learns an ECMP next-hop group for NHID-202. Similarly, upstream node 208 receives NHID-212 paths from intermediate nodes 206*a*, 206*b*, 206*c*, and 206*d* and accordingly learns an ECMP next-hop-group for NHID-212. As can be seen, in this example the ECMP paths for NHID-202 and NHID-212 are identical. As a result, data plane programming (FIB) on upstream node 208 may further share the ECMP object across NHID-202 and NHID-212.

Figure 2C:
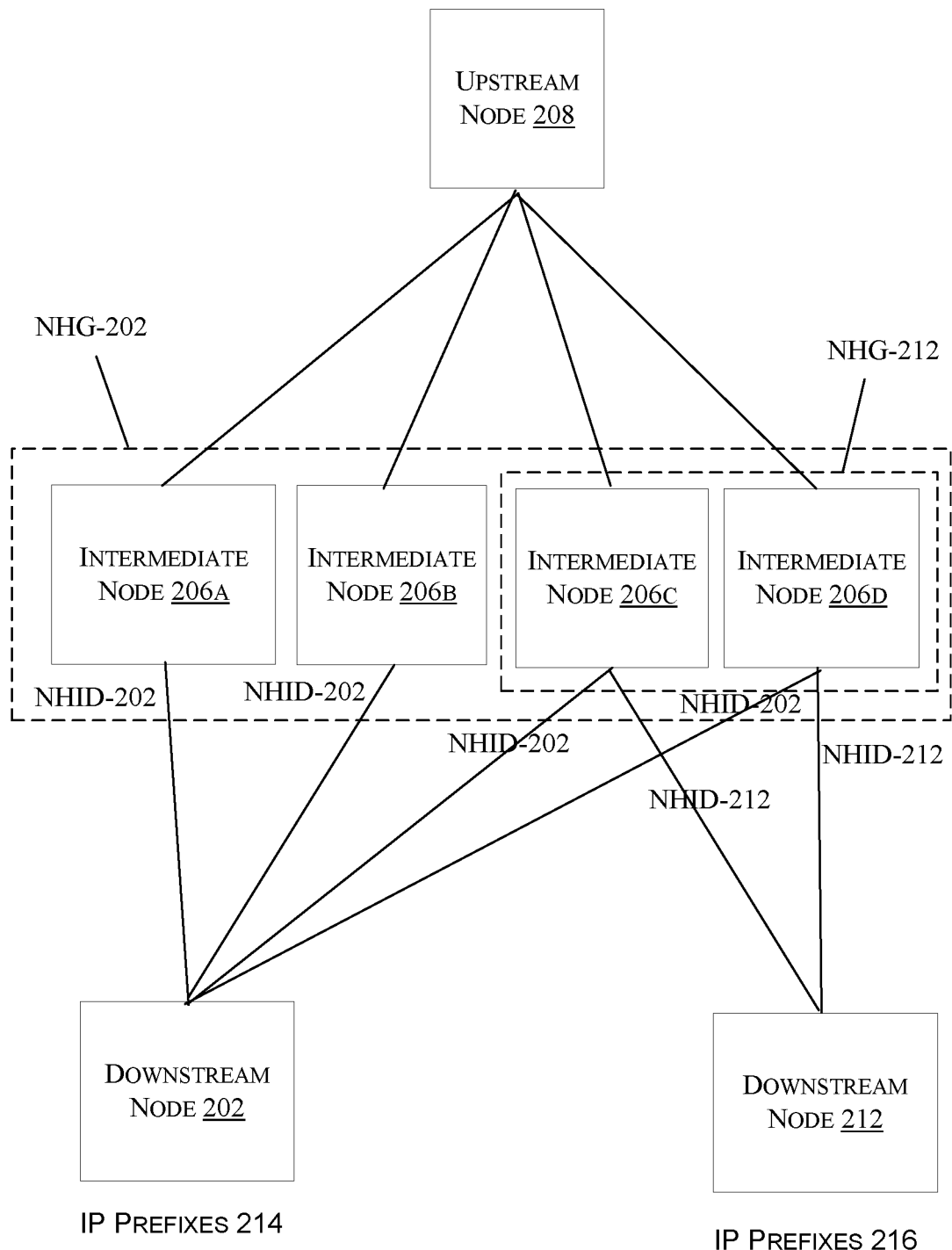

This may not always be the case as in another example illustrated in FIG. 2C, where upstream node 208 receives NHID-202 paths from intermediate nodes 206*a*, 206*b*, 206*c*, and 206*d* and NHID-212 paths from intermediate nodes 206*c* and 206*d*. In the example of FIG. 2C, the NHG-212 only includes intermediate nodes 206*c* and 206*d*.

For example, for IP prefixes 214 reachable via the downstream node 202, intermediate nodes 206*a*, 206*b*, 206*c*, and 206*d* form the shared ECMP next-hop group NHG-202 at the upstream node 208. Once this ECMP next-hop group NHG-202 is learned and programmed on the upstream node 208, IP prefixes 214 originating from the downstream node 202 may now be advertised to the upstream node 208 via the next-hop group NHG-202 of intermediate nodes 206*a*, 206*b*, 206*c*, and 206*d*. For IP prefixes 216 reachable via the downstream node 212, intermediate nodes 206*a*, 206*b*, 206*c*, and 206*d* form the shared ECMP next-hop group NHG-212 at the upstream node 208. Once this ECMP next-hop group NHG-212 is learned and programmed on the upstream node 208, IP prefixes 216 originating from the downstream node 212 may now be advertised to the upstream node 208 via the next-hop group NHG-212 of intermediate nodes 206*a*, 206*b*, 206*c*, and 206*d* (or in the example of FIG. 2C, intermediate nodes 206*c* and 206*d*).

In configurations, a next-hop group route originated at each intermediate node 206 signals a local NHID corresponding to a downstream node to upstream nodes. Two examples for signaling a local NHID to an upstream node include (a) define a new BGP address family identifier/subsequent address family identifier (AFI/SAFI) and a new route type to signal NHID paths or (b) use existing IPv4/IPv6 unicast prefix routes with NHID encoded as the prefix and an additional attribute to indicate that the prefix represents an NHID. For the second example, a next-hop group route signaled from each intermediate node 206 is simply an IPv4/IPv6 unicast route with a prefix set to a local NHID (downstream loopback) and a NHG attribute to indicate NHG membership. An IPv4 or IPv6 unicast network layer reachability information (NLRI), together with the NHG attribute, is used to signal NHG membership from each NHG member node to each upstream node. Main components of this route may include IP prefix NLRI, next-hop address, and NHG_TYPE attribute. The IP prefix may be set to the local NHID. The next-hop may be set as usual to eBGP next-hop-self, which typically is the local interface IP of the peering interface towards the upstream node 208. In addition, route carries a NHG attribute to indicate the IP prefix is a NHID. If a node has multiple eBGP sessions/connected links to a downstream node, it must treat them to be part of the same local NHG. A NHG_TYPE attribute may be defined for this purpose. In configurations, the route may include necessary attributes to ensure that it is never propagated further.

Figure 2D:
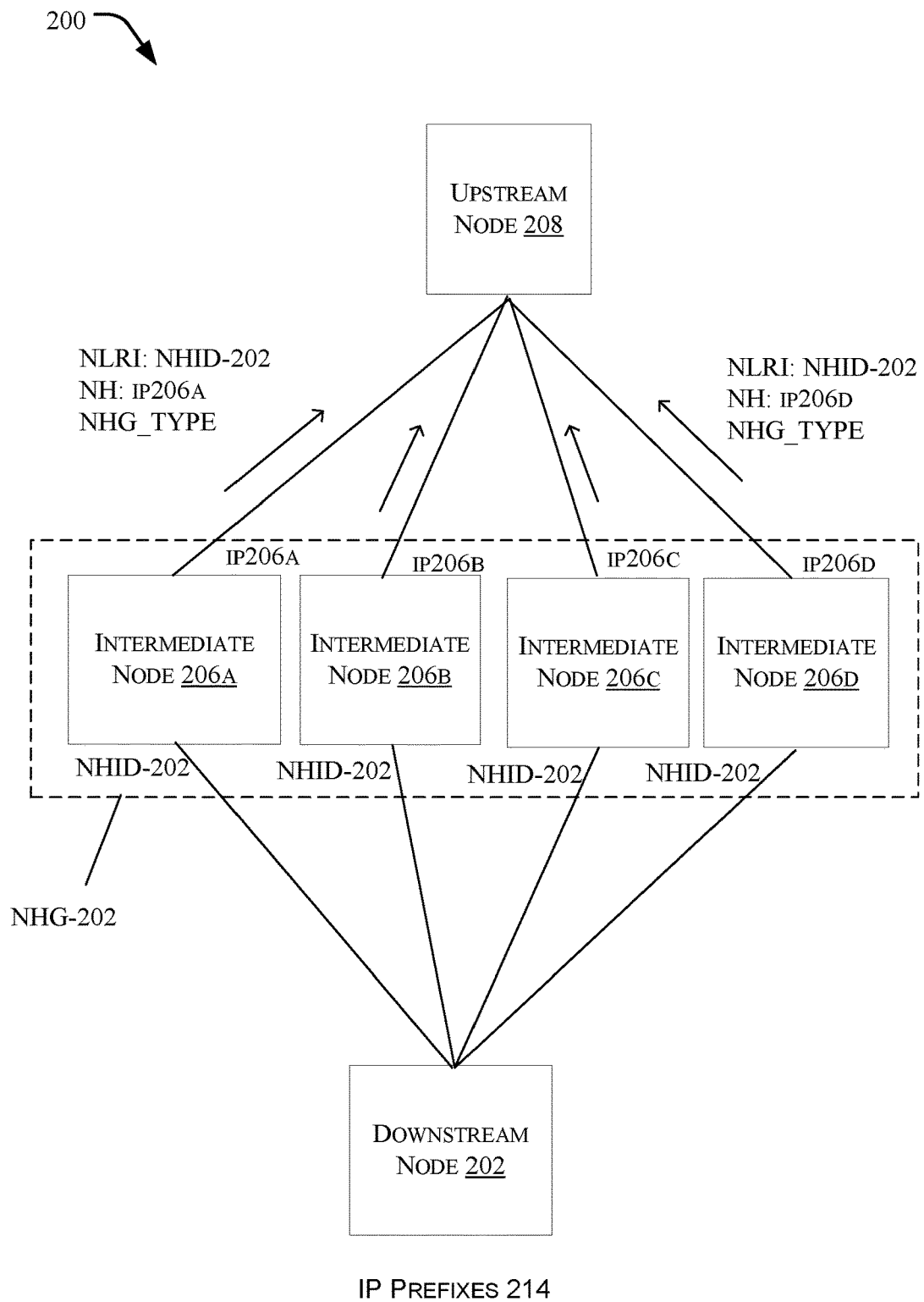

Referring to FIG. 2D, in configurations, each of the intermediate nodes 206*a*, 206*b*, 206*c*, and 206*d* signal reachability to local NHID-202, e.g., downstream node 202, to their upstream peer nodes, e.g., upstream node 208. Upstream node 208 receives NHID-202 paths from downstream intermediate nodes 206*a*, 206*b*, 206*c*, and 206*d* and accordingly learns the ECMP next-hop group comprising intermediate nodes ip206*a*, ip206*b*, ip206*c*, and ip206*d*, e.g., NHG-202, via NHID-202→[ip206*a*, ip206*b*, ip206*c*, ip206*d*]. This ECMP next-hop group NHG-202, keyed by the received NHID-202, may now be programmed in forwarding independent of any IP prefix advertisements from downstream nodes.

In configurations, IP prefixes learned from a downstream node are intended to be signaled to upstream nodes via a NHG indirection represented by a local NHID. Since this indirection represents a group of ECMP next-hops, it makes IP prefix paths advertised from multiple member nodes of the NHG within the same next-hop group redundant. IP prefixes learned on a local NHG are hence advertised upstream by only one of the member nodes within a NHG. Thus, the scale of BGP paths signaled to upstream routers is dramatically reduced. Procedures related to how this is achieved and protected against failures are described below.

Figure 2E:
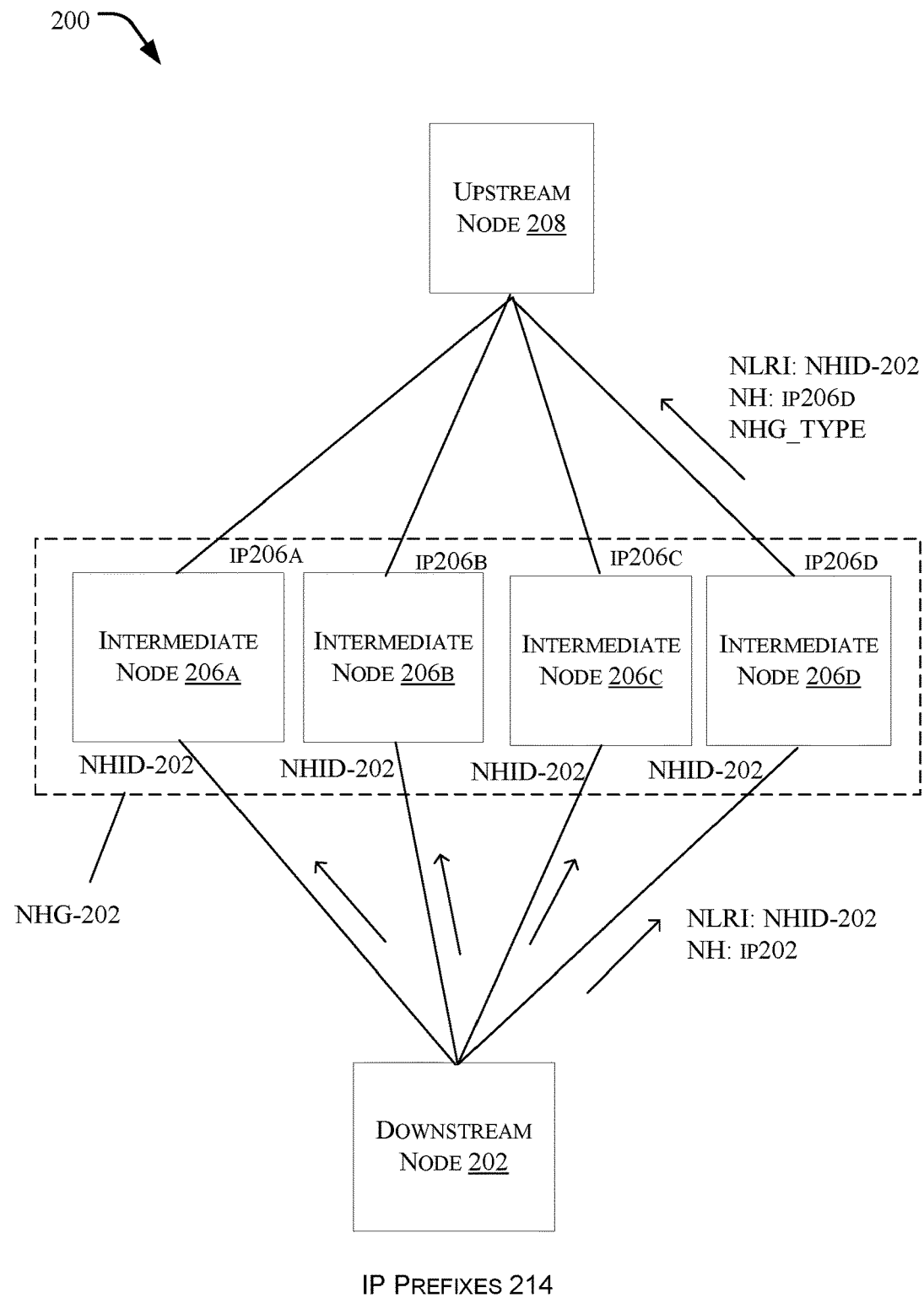

Referring to FIG. 2E, in configurations, for IP prefixes learned from a downstream node e.g., intermediate nodes 206*a*, 206*b*, 206*c*, and 206*d*, a local NHID attribute is associated with each IP prefix based on the NHID associated with this downstream node. IP prefixes are then signaled to upstream nodes with the associated NHID attribute. Upstream nodes, e.g., upstream node 208, treat the received NHID attribute as a NHG indirection for the IP prefix, and program the IP prefix via the NHID indirection in forwarding. ECMP NHG keyed by this NHID is signaled and programmed separately from the IP prefix as described earlier. This results in the following entries in BGP routing information base (RIB) that are installed in RIB and may be further recursively resolved in FIB:

NHID-202→[ip206a, ip206b, ip206c, ip206d]
IP prefixes 214→NHID-202

In configurations, an IP prefix may also be learned from multiple downstream nodes, e.g., intermediate nodes 206a, 206b, 206c, and 206d, and hence may have multiple local NHID attributes associated with it. In such a case, IP prefixes may be advertised upstream with a list of NHID attributes, each representing a separate NHID indirection. The upstream node 208 treats multiple NHID attributes received with an IP prefix as an ECMP set of NHIDs, resulting in a hierarchical ECMP as can be seen in FIG. 2F.

Figure 2F:
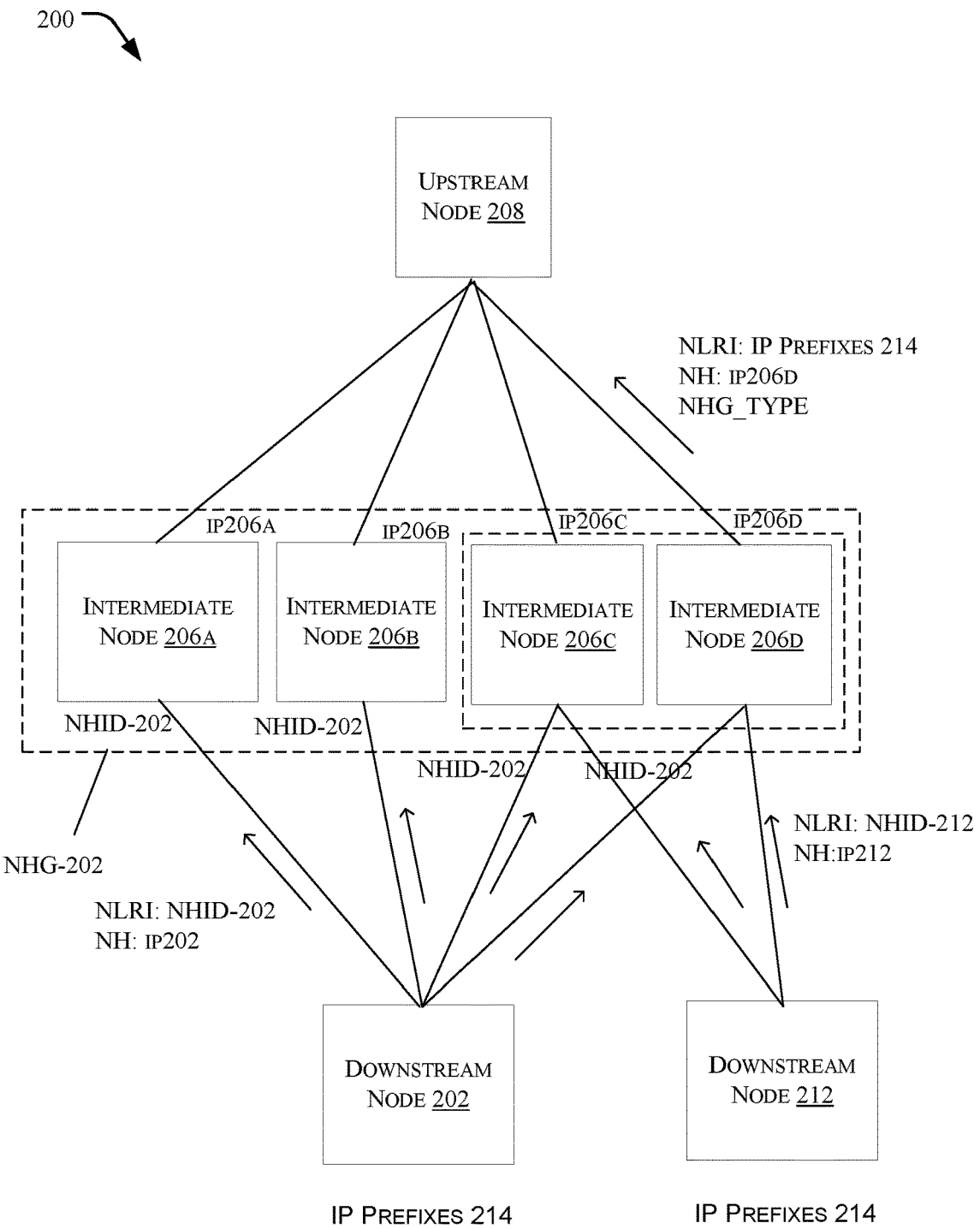

As can be seen in FIG. 2F and Table 1 below, the hierarchical ECMP also results in more proportionate load-balancing of traffic downstream as compared to traditional IPv4/IPv6 unicast signaling. Essentially, since intermediate nodes 206c, 206d have a higher number of downstream links as compared to intermediate nodes 206a, 206b, intermediate nodes 206c, 206d proportionally draw a higher share of traffic from upstream node 208. This would not be the case with a flattened ECMP that would have resulted from traditional IPv4/IPv6 unicast signaling.

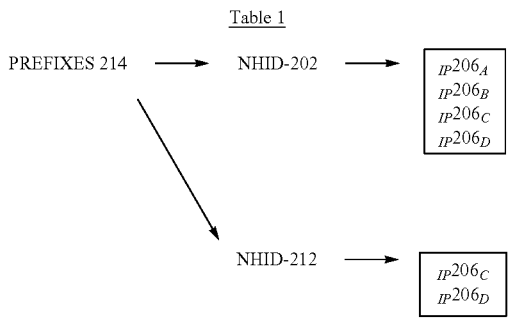

Table 1

Alternatively, the upstream node 208 may receive multiple IP prefix paths via different NHIDs from different downstream intermediate nodes. This also results in IP prefixes being installed via hierarchical ECMP of NHIDs.

In configurations, an IPv4 or IPv6 unicast NLRI, together with an attribute to carry the list of local NHIDs via which the IP prefix may be learned is used to signal IP prefix reachability from NHG member nodes to each upstream node, e.g., upstream node 208. Main components of this route may include: IP prefix NLRI; next-hop address; and NHID-LIST attribute: [NHID-x, NHID-y, . . . ].

In configurations, a tunnel encapsulation attribute may be used to carry the NHG list, which is essentially a list of corresponding local NHIDs via which the IP prefix was learned on the NHG member node from the corresponding downstream node. A new sub-TLV (type-length-value), which may be referred to as NHID-list TLV, may be used for this purpose. This is similar to a remote end-point sub-TLV (see for example, https://tools.ietf.org/html/draft-ietf-idr-tunnel-encaps-08).

In configurations, since IP prefixes are advertised from NHG member nodes to upstream nodes via NHG indirection that represents a group of ECMP next-hops, it makes IP prefix updates from multiple member nodes within the same next-hop-group redundant. IP prefixes learned on a local NHG are hence advertised upstream by only one of the member nodes within a NHG. This requires that a designated member node must be selected or designated within each NHG that is responsible for advertising IP prefix updates from this NHG, e.g., NHG-202, to a given upstream node, e.g., upstream node 208. Note that this selection within an NHG must be specific to each upstream node since all member nodes may or may not have connectivity to identical sets of upstream nodes at any given time.

In configurations, for designated speaker selection, an upstream router, e.g., upstream node 208, that receives NHG routes from NHG member nodes computes a resulting NHG path-list for an NHG, based on paths received from all NHG member nodes, as previously discussed herein. In addition to southbound programming this ECMP NHG, this NHG member list is also used to select a designated speaker from this member list at the upstream node. The designated speaker selection result may be signaled from the upstream node to each NHG member node via a designated speaker route. In configurations, two designated speaker nodes are selected: a primary designated speaker node and a secondary designated speaker node. The NHG member node that is selected as the primary designated speaker node in the result functions as the designated speaker and advertises routes learned via this local NHG to the upstream node. All other NHG member nodes, including the secondary designated speaker node do not advertise routes learned via the NHG to the upstream node, hence dramatically minimizing BGP path scale in a dense topology.

In configurations, for the primary designated speaker node, in the event of a downstream link failure, or an upstream link failure, or a node failure result in NHG route withdrawal from the primary node, e.g., the primary designated speaker node is no longer part of the NHG. On the upstream node, this triggers an update to NHG path-list programming in forwarding to remove the affected path in a prefix independent manner and a designated speaker re-selection. The designated speaker re-selection process on the upstream node includes promotion of the secondary designated speaker node to be the new primary designated speaker node and selection of a new secondary designated speaker node resulting in an update to the designated speaker route to NHG member nodes. The NHG member node newly selected as the primary designated speaker node now announces IP prefixes learned via the NHG to the upstream node. In configurations, the upstream node retains all IP prefixes learned from the old primary designated speaker node during this process (for a predetermined amount of time), in anticipation of receiving these IP prefixes from the old secondary designated speaker node (now the primary designated speaker node, thereby eliminating any IP prefix dependent convergence on any link or node failure in the network.

In configurations, an IPv4 or IPv6 unicast NLRI may be used as the DS route that signals the designated speaker selection result from the upstream node to all NHG member nodes. Main components may include: IP prefix NLRI; next-hop address; and designated speaker_ATTR: [NHID-x, NHID-y]. The IP prefix may be set to the upstream node's local loopback IP. The next-hop address may be set as usual to the local interface peering IP address. A designated speaker attribute may be used to signal the primary and secondary DS IP address. In addition, this route may include necessary attributes (e.g. no-export) and neighbor outbound policies to ensure that it is never propagated further.

Referring to FIG. 2F and Table 1, an example of designated speaker selection may be provided. Upstream node 208, once it discovers NHG-202 and NHG-212's member path-lists, does the designated speaker selection for each of NHGs. NHIDs associated with NHG-202 and NHG-212 are $L_{202}$ and $L_{212}$, respectively. A primary designated speaker node and a secondary designated speaker node is selected for each of NHIDs, $L_{202}$ and $L_{212}$.

In configurations, a standard selection method such as, for example, highest random weight (HRW) or consistent hashing may be used for the designated speaker selection. Taking HRW as an example, upstream node 208 computes a primary and secondary designated speaker node for NHG-202 out of its member list [IP206s, IP206b, IP206c, IP206d] as follows: upstream node 208 considers the hash of (NHID-202*IP$_{2i}$), where IP$_{2i}$ denotes the interface peering IP address of $L_{2i}$ and '*' denotes concatenation in a predefined manner. The designated speaker algorithm chooses the nodes $2k_1$ and $2k_2$ to be the designated speaker$_1$ and the designated speaker$_2$ respectively, based on the highest hash. Similarly, upstream node 208 computes a primary designated speaker node and secondary designated speaker node for NHG-212 out of its member list [IP206c, IP206d]. Upstream node 208 then advertises the designated speaker selection result for NHG-202 and NHG-212 to respective NHG member nodes intermediate tier.

The designated speaker results from node 208 for each of the NHGs may be formatted using an IPv4 unicast route as follows: Upstream node 208 advertises its own loopback with a new attribute that has the designated speaker results to NHG member nodes. This attribute may be in the form of a tlv. Each sub-tlv contains the NHID of the NHG ($L_{202}$ or $L_{212}$) followed by selected designated speakers. In configurations, this is the selected NHG member node's peering IP address with upstream node 208.

If a link or peering towards a downstream node goes down or fails on an NHG member node, this node no longer has the local NHID corresponding to the downstream node. It must hence withdraw the local NHG route corresponding to this downstream peer from all other upstream neighbors. NHG member node failure or a session failure may also effectively result in NHG route delete at an upstream node. An NHG route results in: NHG designated speaker selection on NHG member nodes as previously described above; and NHG ECMP programming on upstream nodes.

As previously noted, in configurations, the designated speaker re-selection process on the upstream node 208 includes promotion of secondary designated speaker node to be the new primary designated speaker node, and selection of a new secondary designated speaker node, resulting in an update to the designated speaker route to NHG member nodes. This results in a NHG member node that is newly selected as the primary designated speaker node announcing IP prefixes learned via the NHG-202 to the upstream node 208. During this process of re-selection, designated speaker updates and IP prefix updates from the new primary designated speaker node, upstream node 208 retains all IP prefixes learned from the previous primary designated speaker node for a predetermined amount of time. This is in anticipation of receiving these IP prefixes from the previous secondary designated speaker node (new primary designated speaker node). Thus, any impact to data path because of the designated speaker re-selection process may be eliminated.

Figure 2G:
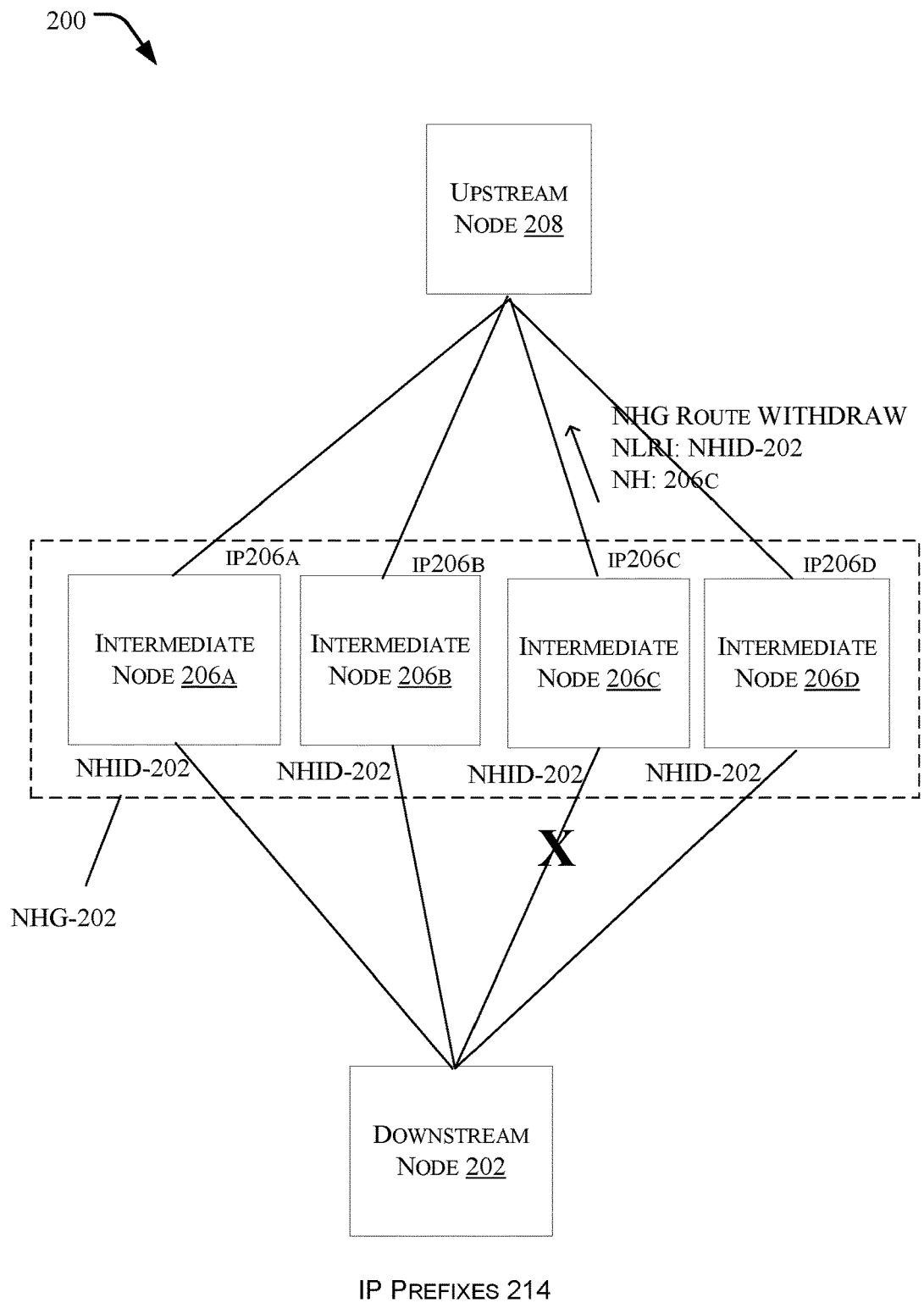

Referring to FIG. 2G, in configurations, on the upstream node 208, as a result of receiving an indication in the form of NHG route withdraw, e.g., from intermediate node 206c, NHID ECMP programming is updated from BGP to RIB/forwarding information base (FIB) to remove the affected path, independent of any IP prefix programming. Most FIBs on modern application-specific circuits (ASICs) would, as a result, be able to update shared ECMP programming for this NHID without having to update child IP prefixes in the IP table. Note that any link/session UP scenario may also be handled in a similar IP prefix independent manner by updating the NHG route in the control plane and corresponding NHID ECMP programming in the data plane. A member node UP or DOWN scenario may again be handled in a similar IP prefix independent manner. This achieves IP prefix independent convergence both in the control plane and in the data plane on any link and node topology changes.

Figure 2H:
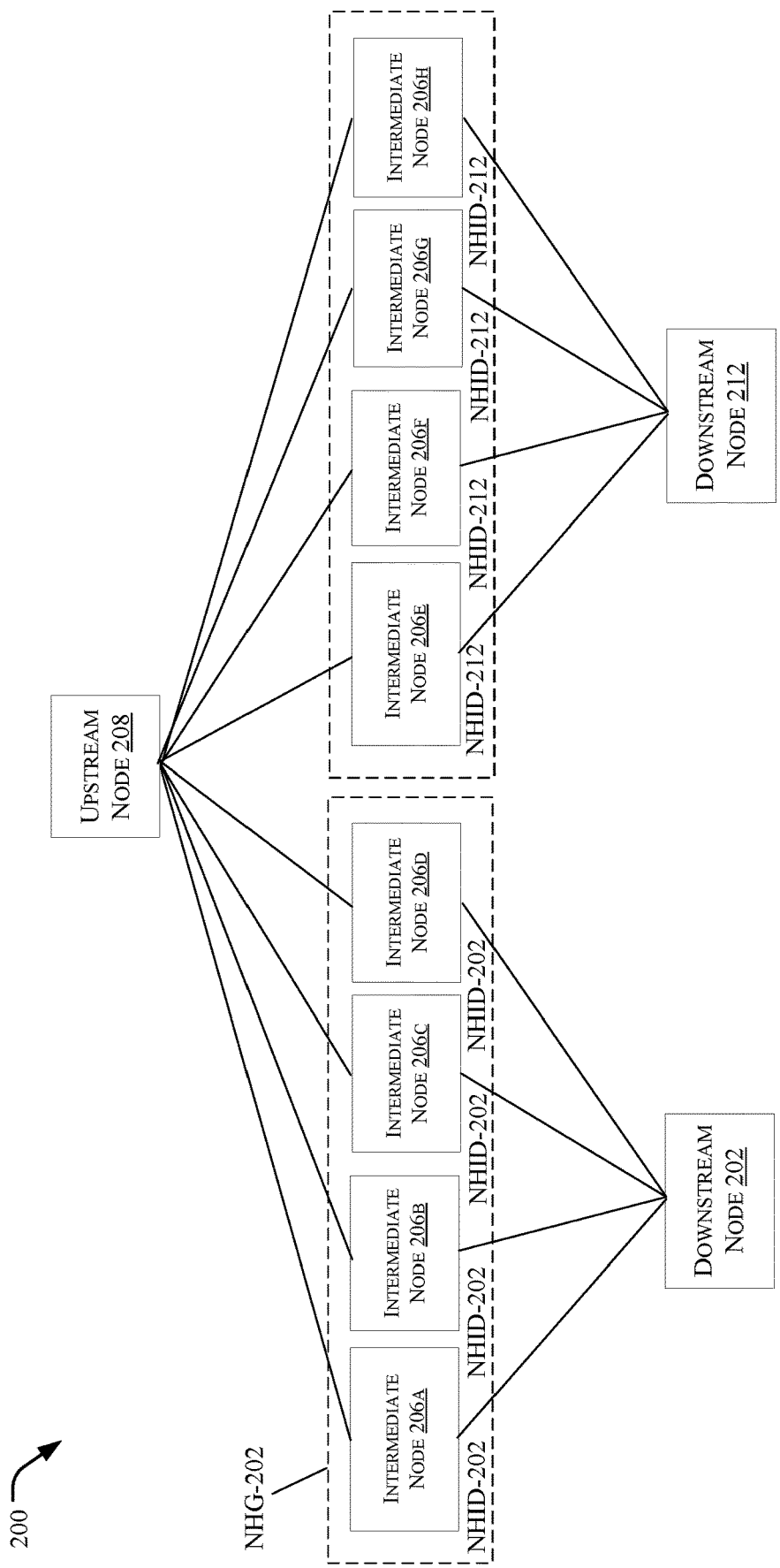

Referring to FIG. 2H and Table 2, a two level 2×4 ECMP is shown that results in accordance with techniques described herein instead of a flattened 8-way ECMP in the example topology of FIG. 2H. The example portion 200 in FIG. 2H includes four more intermediate nodes 206e, 206f, 206g, and 206h. In a more scaled out topology (not shown) with 32 nodes in a next-hop group, and 32 such next-hop groups, such an arrangement results in a two level 32×32 ECMP instead of a 1024-way ECMP that result with traditional eBGP. This results in a much more scalable ECMP programming in the data plane.

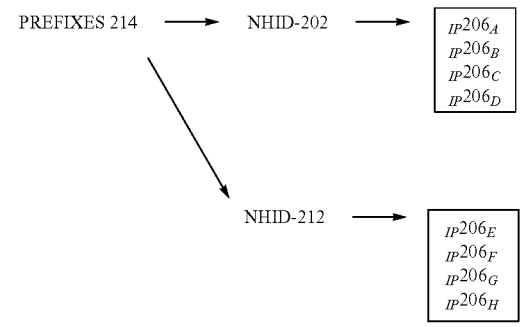

Table 2

Referring back to FIG. 2F, a partially disjoint NHG topology is shown with two NHGs, NHG-202 and NHG-212, and the resulting ECMP programming. NHG-202 includes four intermediate nodes, 206a, 206b, 206c, and 206d, while NHG-212 includes two intermediate nodes with a smaller two node subset. In the example, the same intermediate node 206d happens to be the designated speaker for both NHG-202 and NHG-212. It hence advertises the prefix with both NHID-202 and NHID-212 attributes. Upstream nodes as a result associates this prefix with a second level ECMP across NHID-202 and NHID-212.

Referring back to FIG. 2G, in another example, two different nodes are selected as designated speakers for NHG-202 and NHG-212 respectively. The upstream node 208 receives two separate paths for the IP prefix via NHID-202 and via NHID-212 and hence associates the IP prefix with a second level ECMP across NHID-202 and NHID-212.

Referring to back to FIG. 2B, a fully meshed Clos topology results in multiple NHIDs, e.g., NHID-202 and NHID-212, with identical member sets of intermediate nodes 206a, 206b, 206c, and 206d, at upstream nodes, e.g., upstream node 208. In configurations, ECMP programming in such a scenario may be optimized at the upstream node 208 locally by sharing ECMP path-lists across NHID-202 and NHID-212 in the data plane via a shared locally allocated NHID, e.g., a shared NHID that represents NHID-202 and NHID-212. Alternatively, it may be possible to optimize this at the member nodes by selecting a common designated speaker for NHIDs with identical members and attaching NHID attributes to the list only if they have non-identical members.

It should be noted that the techniques and procedures described herein work for both North-South and East-West flows in the same manner. For any NHG corresponding to a downstream node, nodes east-west of the downstream node behave like upstream nodes.

Figure 3:
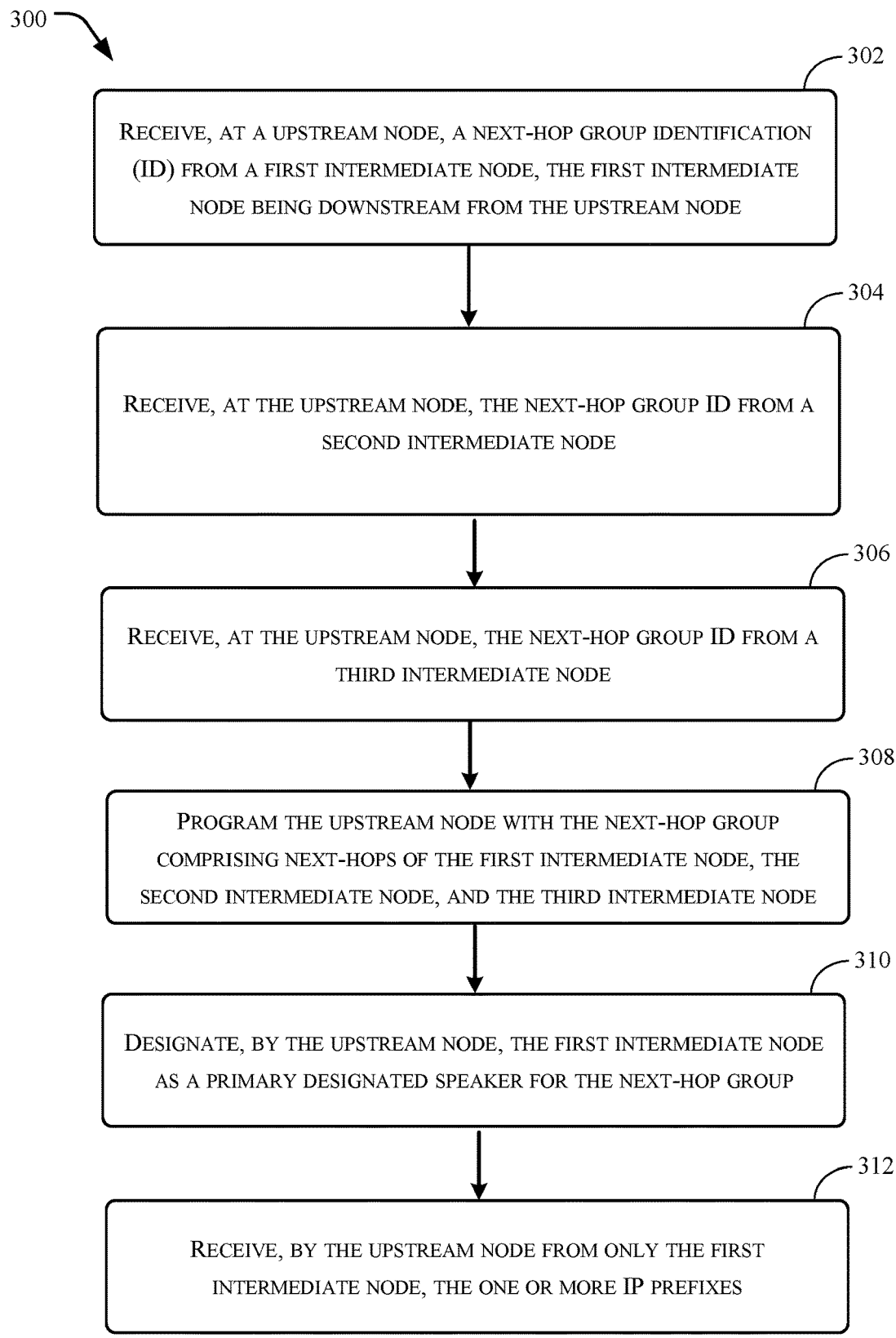
FIG. 3 illustrates a flow diagram of an example method within the equal cost multi-path routing (ECMP) control plane of one or more DC sites of a MSDC Clos network for discovering shared ECMP groups in the control plane independent of per-prefix signaling.

FIG. 3 illustrates a flow diagram of an example method 300 that illustrates aspects of the functions described herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 within the equal cost multi-path routing (ECMP) control plane of one or more data center sites, e.g., DC sites 102, of a massively scalable data center (MSDC) Clos network, e.g., MSDC network 100, for discovering shared ECMP groups, e.g., NHG-202 and NHG-212, in the control plane independent of per-prefix signaling. In some examples, at least some of the techniques of method 300 may be performed by a router at an upstream node, e.g., upstream node 208, intermediate nodes, e.g. intermediate nodes 206a, 206b, 206c, and 206d, and downstream nodes, e.g., downstream nodes 202 and 212. In such examples, the routers may comprise one or more hardware interfaces configured to send and receive commands and/or packets of data in the MSDC network 100, one or more processors, and one or more non-transitory computer-readable media storing computer-executable instructions that, when executed by the one or more processors, cause the one or more processors to perform steps of method 300.

At 302, the upstream node receives a next-hop group identification (ID) from a first intermediate node, the first intermediate node being downstream from the upstream node, wherein the next-hop group ID identifies a next-hop group of intermediate nodes that each have access to a downstream node that has access to one or more Internet Protocol (IP) prefixes. For example, in the context of IP prefixes originated from downstream node 202, downstream node 202 is referred to as the downstream node at upper tier nodes, e.g., for IP prefixes originated from downstream node 202, downstream node 202 is a downstream node at upstream node 208 and intermediate nodes 206a, 206b, 206c, and 206d. In the context of IP prefixes originated from downstream node 202, upstream node 208 is referred to as an upstream node at intermediate nodes 206a, 206b, 206c, and 206d, e.g., for IP prefixes learned from downstream node 202, upstream node 208 is an upstream node at intermediate nodes 206a, 206b, 206c, and 206d. In the context of IP prefixes originated from downstream node 202, intermediate nodes 206a, 206b, 206c, and 206d are referred to as intermediate nodes. Next-hop group (NHG) may be a group of its N nodes that peer with one common downstream node, e.g., downstream node 202. These N nodes are likely to learn the same set of IP prefixes from their common downstream node, e.g., downstream node 202, and advertise them to their common upstream node, e.g., upstream node 208. An NHG may be defined by the N nodes and their common downstream peering node, e.g., downstream node 202 and is of forwarding significance to other upstream nodes peering with these N nodes. For example, NHG-202 is of forwarding significance at upstream node 208. Next-hop group identifier (ID) (NHID) is a globally unique ID assigned to each NHG. This may be configured locally on each of the NHG nodes, e.g., intermediate nodes 206a, 206b, 206c, and 206d representing the common downstream peering node or may be set to the downstream node 202's router-ID or loopback IP. For example, NHID-202 is the next-hop group ID for NHG-202 that represents peering between intermediate nodes 206a, 206b, 206c, and 206d and downstream node 202. NHID-212 is the next-hop group ID for NHG-212 that represents peering between intermediate nodes 206a, 206b, 206c, and 206d and downstream node 212. As previously noted, a shared next hop group (NHG) at an upstream node may be defined as a set of nodes that advertise the same set of IP prefixes learned from a common downstream node to this upstream node. A set of nodes peering to a common downstream node, e.g., downstream node 202, will form an ECMP next-hop group at a common upstream peer node, e.g., upstream node 208, for all IP prefixes signaled from the common downstream node, e.g., downstream node 202.

At 304, the upstream node receives the next-hop group ID from a second intermediate node, the second intermediate node being downstream from the upstream node. At block 306, the upstream node receives the next-hop group ID from a third intermediate node, the third intermediate node being downstream from the upstream node.

At block 308, the upstream node is programmed with the next-hop group comprising next-hops of the first intermediate node, the second intermediate node, and the third intermediate node. At block 310, the upstream node designates the first intermediate node as a primary designated speaker for the next-hop group. For example, an upstream router, e.g., upstream node 208, that receives NHG routes from NHG member nodes, e.g., NHG-202 and NHG 212, computes a resulting NHG path-list for an NHG, based on paths received from all NHG member nodes, as previously discussed herein. In addition to southbound programming this ECMP NHG, this NHG member list is also used to select a designated speaker from this member list at the upstream node. The designated speaker selection result may be signaled from the upstream node to each NHG member node via a designated speaker route. In configurations, two designated speaker nodes are selected: a primary designated speaker node and a secondary designated speaker node.

Figure 4:
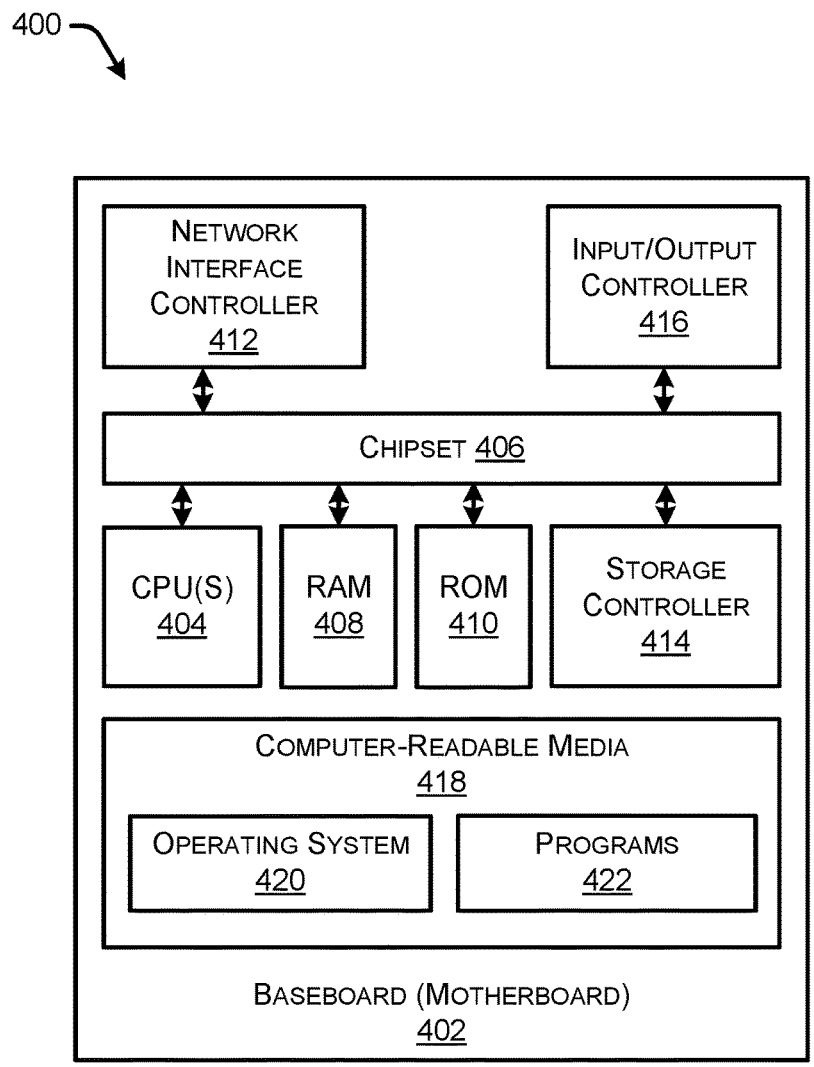
FIG. 4 is a computer architecture diagram showing an illustrative computer hardware architecture for implementing one or more elements of a MSDC network that can be utilized to implement aspects of the various technologies presented herein.

At block 312, the upstream node receives, from only the first intermediate node, the one or more IP prefixes. For example, the NHG member node that is selected as the primary designated speaker node in the selection process functions as the designated speaker and advertises routes learned via this local NHG to the upstream node. All other NHG member nodes, including the secondary designated speaker node do not advertise routes learned via the NHG to the upstream node, hence dramatically minimizing BGP path scale in a dense topology FIG. 4 shows an example computer architecture for a computer 400 capable of executing program components for implementing the functionality described above. One or more computers 400 shown in FIG. 4 may be used to implement one or more elements of the example MSDC network 100 described herein, and may comprise a conventional server computer, workstation, desktop computer, laptop, tablet, network appliance, e-reader, smartphone, or other computing device, and can be utilized to execute any of the software components presented herein. In some examples, however, the computer 400 may correspond to networked devices such as servers, switches, routers, hubs, bridges, gateways, modems, repeaters, access points, etc., and can be utilized to execute any of the software components presented herein.

The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network. The chipset 406 can include functionality for providing network connectivity through a NIC 412, such as a gigabit Ethernet adapter. The NIC 412 is capable of connecting the computer 400 to other computing devices over the network. It should be appreciated that multiple NICs 412 can be present in the computer 400, connecting the computer to other types of networks and remote computer systems.

The computer 400 can be connected to a storage device 418 that provides non-volatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes described above with regard to FIGS. 1-3. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computer 400 might not include all of the components shown in FIG. 4, can include other components that are not explicitly shown in FIG. 4, or might utilize an architecture completely different than that shown in FIG. 4.

The programs 422 may comprise any type of programs or processes to perform the techniques described in this disclosure for managing workloads in compute clusters comprising compute nodes by managing the workloads at the resource level of the compute clusters. Generally, the programs 422 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method within an equal cost multi-path routing (ECMP) control plane, the method comprising:
   receiving, at an upstream node, a next-hop group identification (ID) from a first intermediate node, the first intermediate node being downstream from the upstream node, wherein the next-hop group ID identifies a next-hop group of intermediate nodes that each have access to a downstream node that has access to one or more Internet Protocol (IP) prefixes;
   receiving, at the upstream node, the next-hop group ID from a second intermediate node, the second intermediate node being downstream from the upstream node;
   receiving, at the upstream node, the next-hop group ID from a third intermediate node, the third intermediate node being downstream from the upstream node;
   programming the upstream node with the next-hop group comprising next-hops of the first intermediate node, the second intermediate node, and the third intermediate node;
   designating, by the upstream node, one of (i) the first intermediate node, (ii) the second intermediate node, or (iii) the third intermediate node as a primary designated speaker for the next-hop group; and
   receiving, at the upstream node from only the primary designated speaker for the next-hop group, the one or more IP prefixes.

2. The method of claim 1, wherein the first intermediate node is designated as the primary designated speaker for the next-hop group and the method further comprises:
   designating, by the upstream node, one of (i) the second intermediate node or (ii) the third intermediate node as a secondary designated speaker for the next-hop group.

3. The method of claim 2, wherein the second intermediate node is designated as the secondary designated speaker for the next-hop group and the method further comprises:
   receiving, at the upstream node, an indication from the first intermediate node that the first intermediate node is no longer part of the next-hop group;
   removing, at the upstream node, a path associated with the first intermediate node;
   designating, by the upstream node, the second intermediate node as a new primary designated speaker for the next-hop group; and
   receiving, at the upstream node from only the new primary designated speaker for the next-hop group, the one or more IP prefixes.

4. The method of claim 1, wherein:
   the next-hop group ID is a first next-hop group ID;
   the next-hop group is a first next-hop group;
   the one or more IP prefixes are one or more first IP prefixes;
   the downstream node is a first downstream node; and
   the method further comprises:
      receiving, at the upstream node, a second next-hop group ID from a fourth intermediate node, the fourth intermediate node being downstream from the upstream node, wherein the second next-hop group ID identifies a second next-hop group of intermediate nodes that each have access to a second downstream node that has access to one or more second IP prefixes;
      receiving, at the upstream node, the second next-hop group ID from a fifth intermediate node, the fifth intermediate node being downstream from the upstream node;
      programming the upstream node with the second next-hop group comprising next-hops of the fourth intermediate node and the fifth intermediate node;
      designating, by the upstream node, one of (i) the fourth intermediate node or (ii) the fifth intermediate node as a primary designated speaker for the second next-hop group; and receiving, at the upstream node from only the primary designated speaker for the second next-hop group, the one or more second IP prefixes.

5. The method of claim 4, wherein the fourth intermediate node is designated as the primary designated speaker for the second next-hop group and the method further comprises:
designating, by the upstream node, the fifth intermediate node as a secondary designated speaker for the second next-hop group.

6. The method of claim 5, further comprising:
receiving, at the upstream node, an indication from the fourth intermediate node that the fourth intermediate node is no longer part of the second next-hop group;
removing, at the upstream node, a path associated with the fourth intermediate node;
designating, by the upstream node, the fifth intermediate node as a new primary designated speaker for the second next-hop group; and
receiving, at the upstream node from only the new primary designated speaker for the second next-hop group, the one or more second IP prefixes.

7. The method of claim 4, further comprising:
receiving, at the upstream node, the second next-hop group ID from the third intermediate node.

8. The method of claim 7, further comprising:
designating, by the upstream node, the third intermediate node as a secondary designated speaker for the second next-hop group.

9. The method of claim 8, wherein the fourth intermediate node is designated as the primary designated speaker for the second next-hop group and the method further comprises:
receiving, at the upstream node, an indication from the fourth intermediate node that the fourth intermediate node is no longer part of the next-hop group;
designating, by the upstream node, the third intermediate node as a new primary designated speaker for the second next-hop group; and
receiving, at the upstream node from only the new primary designated speaker for the second next-hop group, the one or more second IP prefixes.

10. An apparatus comprising:
one or more processors; and
one or more non-transitory computer-readable media storing computer-executable instructions that, when executed by the one or more processors, cause the one or more processors to perform actions comprising:
receiving a next-hop group identification (ID) from a first intermediate node, the first intermediate node being downstream from the apparatus, wherein the next-hop group ID identifies a next-hop group of intermediate nodes that each have access to a downstream node that has access to one or more Internet Protocol (IP) prefixes;
receiving the next-hop group ID from a second intermediate node, the second intermediate node being downstream from the apparatus;
receiving the next-hop group ID from a third intermediate node, the third intermediate node being downstream from the apparatus;
programming the apparatus with the next-hop group comprising next-hops of the first intermediate node, the second intermediate node, and the third intermediate node;
designating one of (i) the first intermediate node, (ii) the second intermediate node, or (iii) the third intermediate node as a primary designated speaker for the next-hop group; and receiving, from only the primary designated speaker for the next-hop group, the one or more IP prefixes.

11. The apparatus of claim 10, wherein the first intermediate node is designated as the primary designated speaker for the next-hop group and the actions further comprise:
designating one of (i) the second intermediate node or (ii) the third intermediate node as a secondary designated speaker for the next-hop group.

12. The apparatus of claim 11, wherein the second intermediate node is designated as the secondary designated speaker for the next-hop group and the actions further comprise:
receiving an indication from the first intermediate node that the first intermediate node is no longer part of the next-hop group;
removing a path associated with of the first intermediate node;
designating the second intermediate node as a new primary designated speaker for the next-hop group; and
receiving, from only the new primary designated speaker for the next-hop group, the one or more IP prefixes.

13. The apparatus of claim 10, wherein:
the next-hop group ID is a first next-hop group ID;
the next-hop group is a first next-hop group;
the one or more IP prefixes are one or more first IP prefixes;
the downstream node is a first downstream node; and
the actions further comprise:
receiving a second next-hop group ID from a fourth intermediate node, the fourth intermediate node being downstream from the apparatus, wherein the second next-hop group ID identifies a second next-hop group of intermediate nodes that each have access to a second downstream node that has access to one or more second IP prefixes;
receiving the second next-hop group ID from a fifth intermediate node, the fifth intermediate node being downstream from the apparatus;
programming with the second next-hop group comprising next-hops of the fourth intermediate node and the fifth intermediate node;
designating one of (i) the fourth intermediate node or (ii) the fifth intermediate node as a primary designated speaker for the second next-hop group; and
receiving, from only the primary designated speaker for the second next-hop group, the one or more second IP prefixes.

14. The apparatus of claim 13, wherein the fourth intermediate node is designated as the primary designated speaker for the second next-hop group and the actions further comprise:
designating the fifth intermediate node as a secondary designated speaker for the second next-hop group.

15. The apparatus of claim 14, wherein the actions further comprise:
receiving an indication from the fourth intermediate node that the fourth intermediate node is no longer part of the next-hop group;
removing a path associated with the fourth intermediate node;
designating the fifth intermediate node as a new primary designated speaker for the second next-hop group; and
receiving, from only the new primary designated speaker for the second next-hop group, the one or more second IP prefixes.

16. The apparatus of claim 13, wherein the actions further comprise:

receiving the second next-hop group ID from the third intermediate node.

17. The apparatus of claim 16, wherein the actions further comprise:
designating the third intermediate node as a secondary designated speaker for the second next-hop group.

18. The apparatus of claim 17, wherein the fourth intermediate node is designated as the primary designated speaker for the second next-hop group and the actions further comprise:
receiving an indication from the fourth intermediate node that the fourth intermediate node is no longer part of the next-hop group;
removing a path associated with the fourth intermediate node;
designating the third intermediate node as a new primary designated speaker for the second next-hop group; and
receiving, from only the new primary designated speaker for the second next-hop group, the one or more second IP prefixes.

19. One or more non-transitory computer-readable media storing computer-executable instructions that, when executed by one or more processors, cause the one or more processors to perform actions comprising:
receiving a next-hop group identification (ID) from a first intermediate node, the first intermediate node being downstream from the one or more non-transitory computer-readable media, wherein the next-hop group ID identifies a next-hop group of intermediate nodes that each have access to a downstream node that has access to one or more Internet Protocol (IP) prefixes;
receiving the next-hop group ID from a second intermediate node, the second intermediate node being downstream from the one or more non-transitory computer-readable media;
receiving the next-hop group ID from a third intermediate node, the third intermediate node being downstream from the one or more non-transitory computer-readable media;
designating one of (i) the first intermediate node, (ii) the second intermediate node, or (iii) the third intermediate node as a primary designated speaker for the next-hop group; and
receiving, from only the primary designated speaker for the next-hop group, the one or more IP prefixes.

20. The one or more non-transitory computer-readable media of claim 19, wherein the first intermediate node is designated as the primary designated speaker for the next-hop group and the actions further comprise:
designating one of (i) the second intermediate node or (ii) the third intermediate node as a secondary designated speaker for the next-hop group;
receiving an indication from the first intermediate node that the first intermediate node is no longer part of the next-hop group;
designating the secondary designated speaker as a new primary designated speaker for the next-hop group; and
receiving, from only the new primary designated speaker, the one or more IP prefixes.

* * * * *